(12) United States Patent
Kurihara et al.

(10) Patent No.: US 6,746,510 B2
(45) Date of Patent: Jun. 8, 2004

(54) PROCESSING OF NANOCRYSTALLINE METALLIC POWDERS AND COATINGS USING THE POLYOL PROCESS

(75) Inventors: Lynn K. Kurihara, Alexandria, VA (US); Ralph W. Bruce, Arnold, MD (US); Arne W. Fliflet, Alexandria, VA (US); David Lewis, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/113,651

(22) Filed: Mar. 29, 2002

(65) Prior Publication Data

US 2004/0025635 A1 Feb. 12, 2004

Related U.S. Application Data

(60) Provisional application No. 60/280,534, filed on Apr. 2, 2001.

(51) Int. Cl.[7] .................................................. B22F 9/24
(52) U.S. Cl. .............................. 75/345; 75/362; 75/373
(58) Field of Search .......................... 75/345, 362, 371, 75/373

(56) References Cited

U.S. PATENT DOCUMENTS

| | | | | |
|---|---|---|---|---|
| 5,520,717 A | * | 5/1996 | Miller et al. | ................... 75/345 |
| 5,585,020 A | * | 12/1996 | Becker et al. | ................. 75/345 |
| 5,759,230 A | | 6/1998 | Chow et al. | |
| 6,068,800 A | | 5/2000 | Singh et al. | |
| 6,436,167 B1 | * | 8/2002 | Chow et al. | ................... 75/371 |

OTHER PUBLICATIONS

M.A. Imam, "Wide Range of Material Processing Using A High Frequency Millimeter—Wave Source".

* cited by examiner

*Primary Examiner*—George Wyszomierski
(74) *Attorney, Agent, or Firm*—John J. Karasek; Stephen T. Hunnius

(57) ABSTRACT

Nanostructured metallic powders and coatings are processed by suspending a metal precursor in a glycol solution containing the constituent metal salts and using a millimeter wave beam as the heating source. The mixture is then heated to reduce the metal precursor to a metal precipitate. The precipitated metal may then be isolated.

15 Claims, 2 Drawing Sheets

| COPPER ACETATE CONCENTRATION (M) | TIME (min) | POWER (W) | RESULTS | PARTICLE AND CRYSTALLITE SIZE |
|---|---|---|---|---|
| .215 | 9 | 100 | $Cu_2O$, Cu | |
| .215 | 60 | 120* | Cu | 500 nm CRYSTALLITE, 1-3μm AGGLOMERATE |
| .1 | 7 | 220 | Cu | |
| .1 | 10 | 220 | Cu | 150-200 nm CRYSTALLITE |
| .1 | 15 | 330 | Cu | 80-90 CRYSTALLITE |
| .1 | 20 | 688 | Cu | |

*AVERAGE POWER

FIG. 3

PROCESSING OF NANOCRYSTALLINE METALLIC POWDERS AND COATINGS USING THE POLYOL PROCESS

This application claims the benefit of Provisional Application No. 60/280,534, filed Apr. 2, 2001.

BACKGROUND OF THE INVENTION

1. Field of the Invention

The present invention relates generally to the synthesis of metal powders and films, and more specifically, to the synthesis of nanostructured metal powders and coatings using a millimeter wave gyrotron beam.

2. Description of the Related Art

Metallic powders have been prepared by physical vapor deposition, mechanical blending and mixing, and by chemical routes. Vapor methods are not cost effective and make only small amounts of material. The mechanical blending route often introduces impurities into the final product. Fluidized beds have also been used to coat powders with metals, however, as in vapor methods, the initial equipment is expensive and it is difficult to evenly coat powders and to handle powders of different sizes.

Metallic coatings have been prepared using electroplating and electroless plating. Electroless plating requires that the substrate first is pretreated before plating and the substrate must also be an insulator. Using the polyol method, there does not need to be any chemical pretreatment of the surface and the substrates may be either conductive or insulators.

Nanostructured powders and films (with particle diameters of about 1–100 nm) have many potential electronic, magnetic, and structural applications such as catalysis, electromagnetic shielding, ferrofluids, magnetic recording, sensors, biomedical, electronics and advanced-engineered materials.

Among the various preparative techniques, chemical routes offer the advantages of molecular or atomic level control and efficient scale-up for processing and production. Others in the art have prepared micron and submicron-size metallic powders of Co, Cu, Ni, Pb and Ag using the polyol method. These particles consisted of single elements. Depending on the type of metallic precursors used in the reaction, additional reducing and nucleating agents were often used. The presence of the additional nucleating and reducing agents during the reaction may result in undesirable and trapped impurities, particularly non-metallic impurities.

These prior procedures have been unable to obtain nanostructured powders having a mean size of 1–25 nm diameter. These prior procedures have not been useful in producing nanostructured powders of metal composites or alloys or metal films.

SUMMARY OF THE INVENTION

Accordingly, it is an object of this invention to form nanostructured metal products.

It is a further object of this invention to form nanostructured metallic powders and coatings.

It is a further object of this invention to form nanostructured powders and coatings of metal alloys and metal/ceramic composites.

It is a further object of the present invention to form nanostructured powders and coatings of metals without the need to use a nucleating agent.

It is a further object of the present invention to form nanostructured powders and coatings of metals using a millimeter wave beam.

In this invention, metal salts of the material of interest are suspended or dissolved in a glycol. When substrates are to be coated, the substrate is placed in the metal/glycol mixture. Suspension may be accomplished by proper choice of glycol, powder size, combined with ultrasonification, mechanical agitation or stirring, or utilizing convection due to bubbling. The mixture is heated to reflux and the reduction to the metallic state occurs. As the reduction proceeds, the metal nuclei combine to form nanosized particles, which may remain in the colloidal state, or be further processed to form larger particles which will precipitate out of solution. The precipitated powders may be removed from solution by filtration or centrifugation. The colloidal metallic particles can be concentrated by centrifugation. The concentration of the metal precursor salt, time and temperature of reflux can control coating thickness and particle size. As well as the time required, temperature achieved and rate of temperature change is controlled by the amount of powder in the beam, which can be changed rapidly. Due to the volumetric heating nature of the millimeter wave beam, the heating of the solution can be rapidly turned off and does not rely upon the thermal inertia of conventional heating sources. This, coupled with the small volume sizes, allows for the almost immediate cessation of processing. Precursor salts that can be used include: chlorides, acetates, acetylacetonates, oxides, acids, carbonyls, carbonates, hydrates, hydroxides, nitrates and the glycols used include: ethylene glycol, propylene glycol, tetraethylene glycol, ethoxyethanol, ethylene glycol monoethyl ether, and diethylene glycol diethyl ether.

BRIEF DESCRIPTION OF THE DRAWINGS

The accompanying drawings, which are incorporated in and constitute a part of the specification, illustrate embodiments of the invention and, together with the general description given above and the detailed description of the preferred embodiments given below, serve to explain the principles of the invention.

FIG. 3 is a graph showing millimeter wave processing parameters for the polyol process of copper.

DESCRIPTION OF THE PREFERRED EMBODIMENTS

Figure 1:
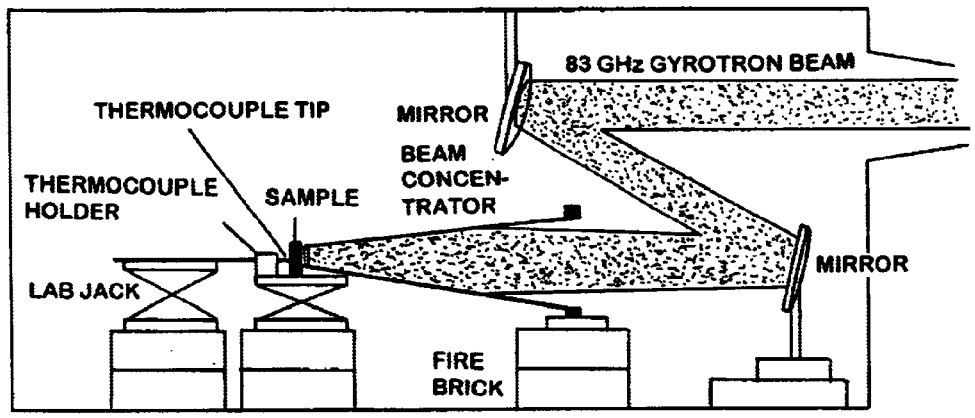
FIG. 1 is an overall view of the experimental apparatus.
Figure 2:
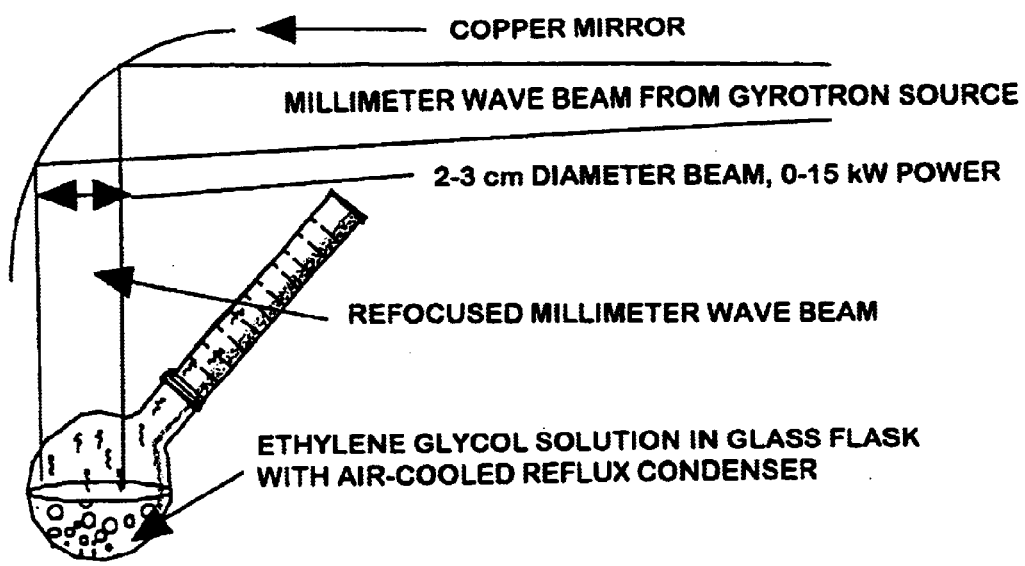
FIG. 2 is a schematic of millimeter wave driven polyol process for nanophase material production and coating with rapid direct heating with millimeter wave beam source.

In practicing the present invention, a metal precursor is mixed with a glycol solvent or high boiling organic solvent. Any glycol solvent that is liquid and dissolves the metal precursor or precursors, or allows the metal precursor or precursors to react, at the reaction temperature may be used. Any organic solvent that is liquid or will become liquid at temperatures greater than 25° C., and dissolves the metal precursor so that they may react with the glycol solvent may be used. The glycol solvent may then be added to the metal precursor in the organic solvent any time after dissolution of the metal precursor. For example, the polyols described by Figlarz et al., in U.S. Pat. No. 4,539,041, or described by Chow et al., in U.S. Pat. No. 5,759,230, the entireties of which are incorporated herein by reference for all purposes, may be used. Specifically, Figlarz et al. recites the use of aliphatic glycols and the corresponding glycol polyesters, such as alkylene glycol having up to six carbon atoms in the main chain, ethylene glycol, a propylene glycol, a butanediol, a pentanediol and hexanediol and polyalkylene glycols derived from those alkylene glycols. Alcoholic solvents typically used in the method of the present invention include ethylene glycol, diethylene glycol, triethylene glycol, tetraethylene glycol, propylene glycol, ethoxyethanol, butanediols, ethylene glycol monoethyl ether, diethylene glycol monoethyl ether, diethylene glycol diethyl ether, octanediol, and dodecanediol. If desired, mixtures of glycols may be used.

The metal precursor or precursors are then mixed with a glycol solvent. At the time of mixing, this glycol may be either heated or unheated. Then, the resulting mixture is reacted at temperatures sufficiently high to dissolve, or allow the reaction of, the metal precursor or precursors and form precipitates of the desired metal. Usually, refluxing temperatures are used. Generally, the mixture is reacted at about 85° C.–350° C. Typically, the reaction mixture is reacted at about 150° C.–220° C. The preferred temperature depends on the reaction system used.

The heat source utilized is millimeter wave beam system, based on 83 Ghz gyrotron with superconducting magnets, which produces up to 15 kW of CW power. The beam can be focused to a spot size of several millimeters. The millimeter wave source permits greatly accelerating the polyol process with the result of production of powders of smaller particle size and greater particle size uniformity.

The high intensity millimeter-wave beams ($10^2$–$10^5$ W/cm$^2$) that can be generated by powerful gyrotron oscillators have unique capabilities for rapid, selective heating of many materials to high temperatures for various purposes. The efficacy of such rapid heating, for production of nanophase materials and the processing of such materials into useful components, has been demonstrated. Some of the advantages of using a millimeter wave beam as the heat source include rapid heating and cooling, volumetric heating, elimination of thermal inertia effects, and spatial control of heating. The millimeter-wave beam system, using the gyrotron source at the wavelength of ca. 83 GHz, can be focused to a spot size as small as 0.5 cm if necessary, and, being a beam source, can also be steered, defocused, and shaped as necessary. The gyrotron is also unusual among microwave sources in supplying a polarized beam which can be used to advantage in certain types of material processing. In some experiments, the typical casketing employed to produce uniform microwave heating in lower frequency systems has been used as well to generate a mini-cavity from the millimeter-wave source. The millimeter wave provides a very effective heating source in the polyol process in production of nanophase metal, metal alloy and ceramic powders. This source allows for very short processing times and high heating rates, due to bulk heating of the solution. This results from direct coupling of the beam energy to the polyol solution. Rapid heating of solid bodies and solutions is possible because the heating rate is not limited by the requirement to transport heat to and through the interior of a body or solution. Localized heating is here made possible by the beam nature of the source and the relatively short wavelength, ca. 3 mm. The high frequency source used provides much better coupling to many low loss materials such as oxides and nitrides, permitting better control of heating of such materials. The short wavelength also permits coupling significant amounts of energy into objects of relatively small dimensions, such as joints and thin coatings. The gyrotron system used is a relatively high power system, ca. 15 kW continuous power, designed as a robust industrial system, with a superconducting magnet cooled via refrigerator, and which operates at very high wallplug efficiency.

The millimeter wave heating source allows for very short processing times, high heating rates, the ability to selectively coat substrates, and the ability to work in a superheated liquid region. Direct coupling of the beam energy to the solution elements results in high heating rates due to bulk heating. The ability to focus the beam allows for the ability to selectively coat substrates.

Other advantages of the millimeter wave include no worry of heat conduction, faster reaction time, preferential heating, more uniform heating, more control, smaller particle size, and a narrow distribution of particle size. The process can be carried out either by batch or continuous process.

After the desired precipitates form, the reaction mixture may be cooled either naturally (e.g., air cooling) or quenched (forced cooling). Because quenching provides greater control over the reaction time, it is preferred to air cooling. For quenching to be useful in the deposition of a conductive metal film upon a substrate, however, the substrate and the film/substrate interface must be able to withstand rapid thermal changes. If the substrate and/or film/substrate interface cannot withstand these rapid thermal changes, then air cooling should be used.

The method of the present invention may be used to form particles of various metals and alloys or composites thereof. For example, nanostructured films or powders of transition metals such as Cu, Ni, Co, Fe, Mn, or alloys or composites containing these metals, may be made according to the present invention. Further examples include Cr, Zn, Ga, Ru, Rh, Pd, Ag, Cd, Sn, Sb, W, Re, Ir, Pt, Au, and Pb. Still further examples are alloys of any of the above, such FePt, FeNi, FeCo, CuCo, etc. As explained below, the precursor form for the metal will depend upon the metal itself. Generally, the precursor may be any metal-containing compound that, under the reaction conditions, is reduced to the elemental metal and by-products that are soluble in the reaction mixture. Typical precursors include metal acetates and hydrates thereof, metal chlorides and hydrates thereof, metal nitrates, metal oxides, metal oxalates, metal acetates, metal carbonyls, metal hydroxides, and metal chlorides and carbonates. The best precursors to use for the formation of nanostructured powders and films including any specific metal will depend upon the metal selected. Typically, to provide nanostructured materials, the precursors used in the present invention should be substantially soluble in the reaction mixture.

The concentration of the precursor in the reaction mixture seemed to influence crystallite size in only some cases over the concentration ranges explored in the examples discussed below. Where this influence was noted, smaller precursor concentration tended to provide smaller crystallites and particles. If the concentration of the precursor is too small, few, if any precipitates will form. Too high of a concentration of the precursor may result in crystallites that are larger than sub-micron size. Additionally, sufficient glycol solvent must be present to completely reduce essentially all metal precursors in the reaction mixture. Otherwise, the unreacted precursor may prevent the formation of a pure or essentially pure nanostructured metal material. Typically, the precursors are used in concentrations of about 0.001–2.00M, more often about 0.05–0.50M, and most often about 0.1–0.25M.

In the present invention, typical reaction times, at refluxing temperatures, extend from about 10 seconds to about 180 minutes, and more often from about 1 minute to about 60 minutes.

The method of the present invention can produce nanostructured powders and films in the absence of a nucleating agent or catalyst. The resulting nanostructured films can thus be free or essentially free of impurities that would deleteriously alter their properties. If desired, surfactants and/or dispersants may be added to the reaction mixture to avoid the agglomeration of nanoparticles. If a highly pure product is desired, these surfactants and dispersants should be essentially free of insoluble materials, or capable of being burnt out of the final product. Where a surfactant is used, the best choice of surfactant will depend upon the desired metal. Steric stabilization, using a nonionic surfactant (e.g., a high temperature polymeric surfactant), is preferred, since ionic surfactants may undesirably alter the pH of the reaction system during reduction of the metal precursor. If desired, however, a mixture of ionic and nonionic surfactants can be used. If desired, high boiling point organics or capping agents may be added to the reaction mixture to avoid agglomeration. Examples of capping agents include any of the caboxylic acids of triglycerides such as: oleic acid, linoleic acid, linolenic acid and other high molecular weight acids, stearic acid and caprioc acid, and other agents such as trialkylphosphines.

The pH may influence the method of the present invention. For examples, changing the pH during the reaction may be used to alter the solubility of the reaction product in the reaction mixture. By altering the solubility of the smallest crystallites during the reaction, the average size of the crystallites obtained may be controlled. If a constant pH is desired throughout the reaction, the reaction mixture may be modified to include a buffer.

During the reaction, the reaction mixture may, but need not, be stirred or otherwise agitated, for example by sonication. The effects of stirring during the reaction depend upon the metal to be formed, the energy added during stirring, and the form of the final product (i.e., powder or film). For example, stirring during the production of a magnetic material would most likely increase agglomeration (here, the use of a surfactant would be beneficial), while stirring during the formation of a film would most likely not significantly affect the nanostructure of the film. Stirring during the formation of films, however, will probably influence the porosity of the formed films and thus may be useful in sensor fabrication.

To produce a nanostructured film, the substrate upon which the film is to be provided is contacted with the reaction mixture during the reaction. Unlike electrochemical deposition methods, which require an electrically conductive substrate, the present invention can provide thin, adherent (as determined by the adhesive tape test) nanostructured films on any surface, including electrically insulating substrates. Also, unlike aqueous electroless plating methods, the process of the present invention can produce thin, adherent nanostructured metal films on surfaces that should not be processed in aqueous environments.

In particular, the process of the present invention can be used to deposit nanocrystalline metallic films on substrates glasses including borosilicates, such as Pyrex™, glasses that are essentially free of borosilicates, polyimides such as Kapton™, perfluorinated polymers such as Teflon™ (polytetrafluoroethylene), aluminum nitride, carbon, and alumina. The method of the present invention deposits nanocrystalline metallic films on both two dimensional substrates (flat surfaces) and three-dimensional substrates (e.g., fiber and preforms).

The method of the present invention may also be used to produce nanostructured composite metal films and powders. As defined herein, a composite metal film includes at least one metal first component and at least one other component that is intentionally included in amounts that significantly enhance the desirable properties of the film or powder. The other component, which is also nanostructured, is usually, but not necessarily, a metal. Where the other component is a metal, the metal may be any metal, not just those metals that could be deposited as a pure film according to the method of the present invention. Throughout the present specification and claims, the term "complex substance" is defined as a composite or an alloy that includes at least two different components. Throughout the present specification and claims, the term "alloy" applies to intermetallic compounds and solid solutions of two or more metals. The term "composite" applies to phase-separated mixtures of a metal with at least one other component. Where the other component of the final product is a chemically stable ceramic, the present invention provides a nanostructured metal/ceramic composite. Generally, a metal/ceramic composite includes at least 50 volume percent metal, in the form of a single phase material or an alloy. Throughout the present specification and claims, the term "composite" includes alloys, and metal/ceramic composites.

To produce the complex substances, a precursor(s) for the at least one metal component and precursors for the other component or components are atomically mixed in the reaction mixture before heating the mixture to the reaction or refluxing temperature. Otherwise, the process proceeds as described above in the case of powders and films, respectively.

In producing composite substances according to the present invention, the initial molar ratios of the components to each other may not be reflected in the final product. Additionally, the ability of precursors for the components to atomically mix in the reaction solution does not assure that the components will form a composite substance final product. For this reason, the correct starting ratios of the precursors of each component for any composite substance must be determined empirically. The relative reduction potentials of each component can provide some guidance in making this empirical determination.

The solvent in the process is recyclable. The powder feedstock can be any size or shape. The process of the present invention also allows for the following aspects: the deposition of magnetic materials; the preparation of colloidal metals; the deposition of single elements, alloys and multicomponent elements; bulk heating of the solution which results from direct coupling of the beam energy to the solution elements; the alloying of immiscible metals; and the control of coating thickness and very rapid heating and control of solution kinetics.

Having described the invention, the following examples are given to illustrate specific applications of the invention including the best mode now known to perform the invention. These specific examples are not intended to limit the scope of the invention described in this application.

EXAMPLES

Fine metal particles have many uses in pigments, magnetic materials, catalysts, electromagnetic shielding, ferrofluids, sensors, biomedical, electronics and advanced-engineered materials. Among the various preparative techniques used to prepare nanoscale particles, the polyol method, in which the polyol acts as a solvent, the reducing agent, and also as a surfactant, is an excellent method for preparing nanophase and micron size particles. In this process, the millimeter wave beam was directed into the flask containing the polyol solution by a 15 cm diam. concave mirror (48 cm radius of curvature). The beam was approximately 3 cm in diameter at the reaction flask at its location in the work chamber. The flask was set up, in initial experiments, with an air-cooled reflux condenser and the beam was centered on the glycol-metal solution (FIG. 3.) Subsequent experiments have used water cooled reflux condensers to get better process control (less superheat) and have employed Type K thermocouples directly in the solution to provide an accurate control parameter for the power.

The general procedure for the synthesis of different metallic powders and coatings involved preparing a mixture of the metal precursor in ethylene glycol (1,2-propanediol) and bringing the mixture to reflux (ca 160–200° C.). In most cases, refluxing of the glycol solution was observed within a minute of turning on the millimeter-wave beam. This is much more rapid than can be obtained with a conventional heating mantle driven reflux system. However, some of the typical values used in the experiments were: a metal precursor concentration ranging from 0.01–0.3M, and reaction times ranging from 1 minute to 60 minutes. The gyrotron was operated at relatively low power levels of ca. 30–750 W, at a nominal frequency of 82.6 GHz; these power levels were more than adequate for the small processing volumes used in these experiments. During the processing, the gyrotron power was controlled to maintain continuous refluxing, as observed visually. In subsequent experiments, power was controlled to maintain a constant amount of superheat, based on the thermocouple in the polyol solution. After the reaction was completed, the metal-glycol mixture was cooled to room temperature for analysis. For film deposition experiments, an AlN substrate was placed in the metal-glycol solution for direct coating during the particle production. The crystal structure of the powders and coatings were studied using X-ray diffraction (XRD). Line broadening of XRD peaks was used to estimate the average crystallite size. The morphology of the particles and crystallites was investigated using scanning electron microscopy (SEM) and transmission electron microscopy (TEM).

Results for Millimeter-Wave Polyol-Derived Powders

Powders of a variety of transition metals (Cu, Ni, Co, Fe, Mn, etc.) and mixtures of these have been synthesized by reducing metal precursors in a millimeter-wave driven polyol solution. The precursors used in our study included acetates, oxides, hydroxides, chlorides and carbonates. Results are shown below for copper, which has been studied the most. FIG. 3 shows the relationship between the processing parameters of power and time for copper. With power at 100 W, and processing time of 9 minutes, the predominant phase of copper by XRD is $Cu_2O$, although there was a small amount of copper metal present (~20%). Increasing the average power lead to formation of copper metal. However, after 60 minutes with the beam on, copper was present, but now agglomerated. The average agglomerate size was 1–3 microns, with an average crystallite size of 500 nm. Further increasing the power output, while decreasing the time and concentration, also produced copper metal. In this case, (power=220 W, time=10 minutes) the average crystallite size dropped to 150–200 nm. Increasing the power further to 330 W produced copper with an average crystallite size of 80–90 nm. Experiments are currently underway to further decrease the particle size. The comparison with conventional reflux processing is interesting. While the millimeter wave system can produce Cu nanoparticles in 15 minutes or less, with reflux processing with a conventional heating mantle only copper acetate is present after 15 minutes, and only $Cu_2O$ after one hour of refluxing, where the millimeter wave system produces Cu nanoparticles in less than 15 minutes, at the same apparent temperature.

Continuous Millimeter-Wave Polyol Processing of Nanophase Metals

An approach has been developed to permit continuous production of nanophase metal powders, using the polyol process and the millimeter-wave beam facility. This approach offers the potential of much better process control than in a conventional reflux system, the ability to make smaller particles of a narrower size distribution, and an economical way to produce large quantities of nanophase metal powders at reasonable cost. This approach can be explored for copper and various transition metals, particularly for metals and metal alloys for magnetic applications.

What is claimed is:

1. A method of forming a nanocrystalline metallic powder, comprising the steps of:
    mixing a metal salt in a glycol solvent to form a reaction mixture;
    applying a millimeter-wave beam to said reaction mixture;
    refluxing said reaction mixture so that said glycol solvent reduces said metal salt to a metal, over a time selected to produce particles of said metal having a mean diameter size of about 100 nm or less.

2. The method of claim 1, wherein said mixing step and said refluxing step are performed in such a manner that said particles of said metal are essentially free of non-metallic impurities.

3. The method of claim 2, wherein said mixing step and said reacting step are performed in such a manner that said particles of said metal are essentially pure.

4. The method of claim 1, wherein said metal salt is selected from the group consisting of chlorides, acetates, acetylacetonates, oxides, carbonyls, carbonates, hydrates, hydroxides, and nitrates.

5. The method of claim 1, wherein said glycol solvent is selected from the group consisting of ethylene glycol, propylene glycol, tetraethylene glycol, ethoxy ethanol, diethylene glycol, monoethyl ether, and mixtures thereof.

6. The method of claim 1, wherein said mixture is filtered, centrifuged, or magnetically separated to remove said particles.

7. The method of claim 1, wherein said millimeter-wave beam is generated by gyrotron oscillators.

8. The method of claim 1, wherein said millimeter-wave beam has an intensity of about $10^2$–$10^5$ W/cm$^2$.

9. The method of claim 1, wherein said millimeter-wave beam has a frequency of about 83 GHz.

10. The method of claim 1, wherein said millimeter-wave beam has a power of about 30–750 W.

11. The method of claim 1, wherein said millimeter-wave beam is polarized.

12. The method of claim 1, wherein said millimeter-wave beam is a free-space quasi-Gaussian beam.

13. The method of claim 1, wherein said metal salt has a concentration of about 0.01–0.3 M.

14. The method of claim 1, wherein said refluxing step is conducted for about 15 minutes.

15. A method of forming a nanocrystalline metallic powder, comprising the steps of:
    mixing a metal salt in an alcoholic solvent to form a reaction mixture, wherein the metal salt concentration is about 0.1 M;
    applying a millimeter-wave beam to said reaction mixture, wherein said millimeter-wave beam has a power of about 330 W;
    refluxing said reaction mixture so that said alcoholic solvent reduces said metal salt to a metal; and
    wherein said refluxing occurs for 15 minutes to produce particles of said metal having a mean diameter size of about 80 nm or less.

* * * * *